Nov. 19, 1929.  J. G. GRAY  1,736,039
GYROSCOPIC APPARATUS
Filed July 1, 1927  3 Sheets-Sheet 1

Inventor:
James Gordon Gray
by Robert Kalm
Attorneys.

Nov. 19, 1929.  J. G. GRAY  1,736,039
GYROSCOPIC APPARATUS
Filed July 1, 1927  3 Sheets-Sheet 2

Inventor:
James Gordon Gray
by Robert Calvert
Attorneys.

Nov. 19, 1929.    J. G. GRAY    1,736,039
GYROSCOPIC APPARATUS
Filed July 1, 1927    3 Sheets-Sheet 3

Patented Nov. 19, 1929

1,736,039

UNITED STATES PATENT OFFICE

JAMES GORDON GRAY, OF GLASGOW, SCOTLAND

GYROSCOPIC APPARATUS

Application filed July 1, 1927, Serial No. 203,350, and in Great Britain July 3, 1926.

This invention relates to improved gyroscopic apparatus for defining the vertical on moving bodies or vehicles such as ships, airships and aeroplanes, and for stabilizing instruments of precision when mounted on such bodies or vehicles.

The principle underlying the apparatus of the invention is described in my Patent No. 1,442,799 of 23rd January, 1923, and involves the attachment of a gyroscope or gyroscopes to the vehicle by means of frames and pivots or the equivalent in such manner as to constitute a gyroscopic stabilizer presenting, athwart the vehicle, a component of angular momentum or spin, whose amount is the product of the mass of the system carried on fore and aft pivots which attach the system to the vehicle, the distance of the centre of gravity of the system below the line of said pivots, and the speed of the vehicle relatively to the medium in which it moves; provided that the direction or sense of this spin is clockwise as viewed from the starboard side of the vehicle, the pivoted system is not disturbed by the centrifugal couples which accompany turning movements of the vehicle.

Figure 1:
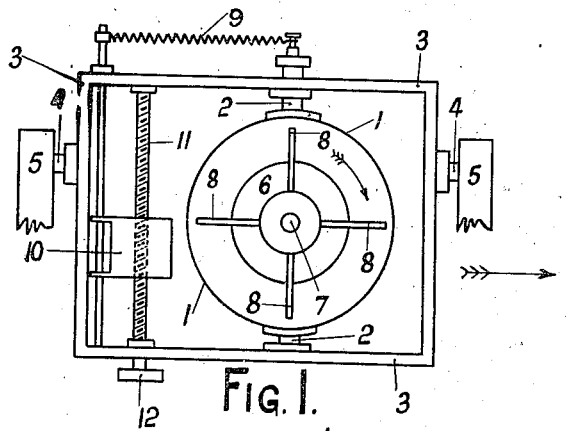
Figures 2, 12:
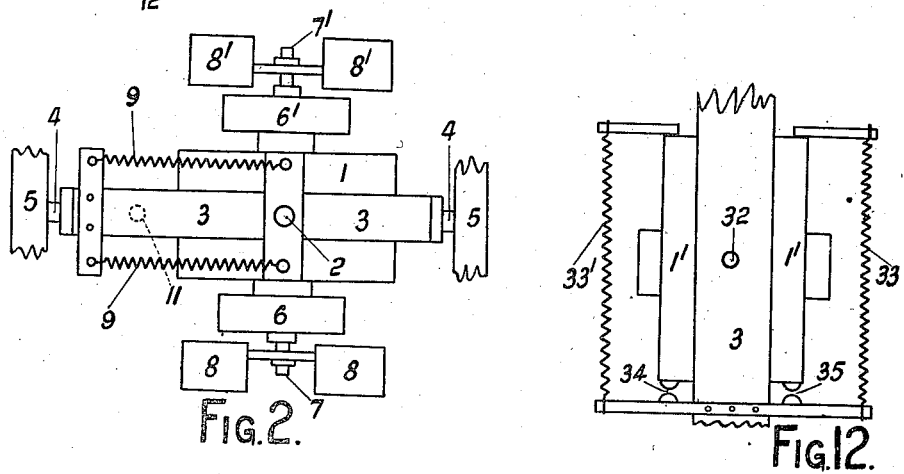
Figure 3:
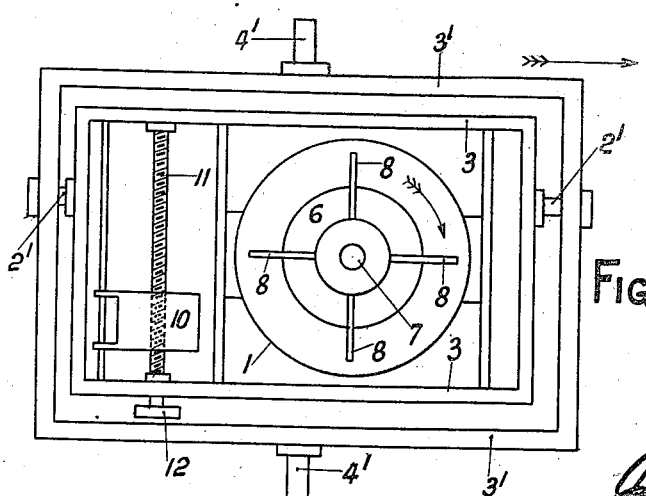
Figure 4:
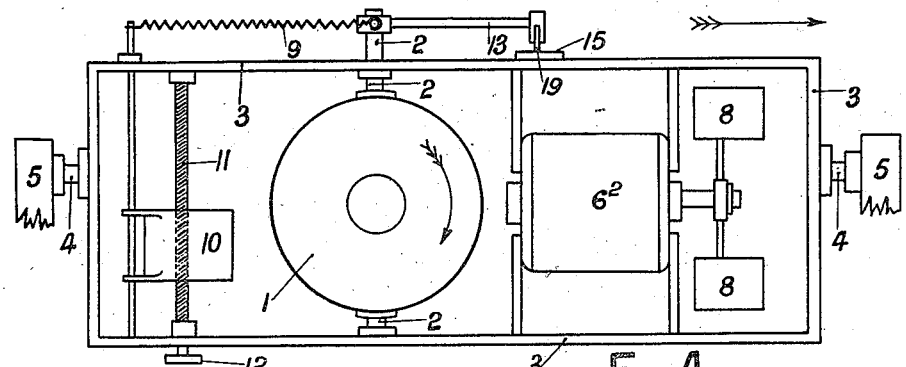
Figure 6:
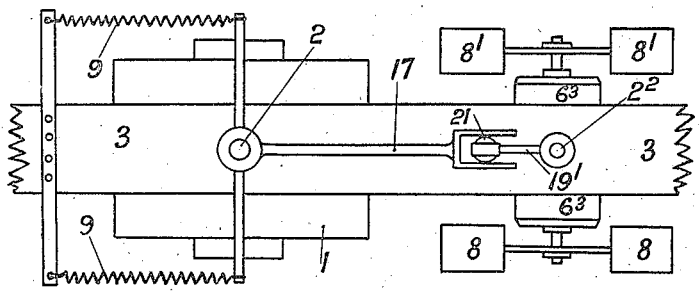
Figure 7:
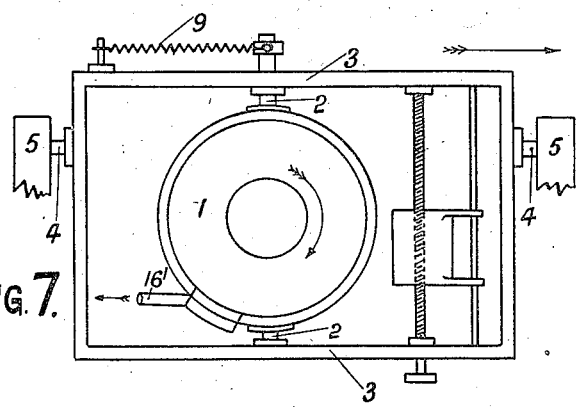
Figure 8:
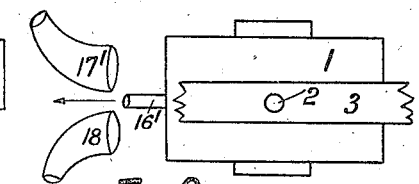
Figure 9:
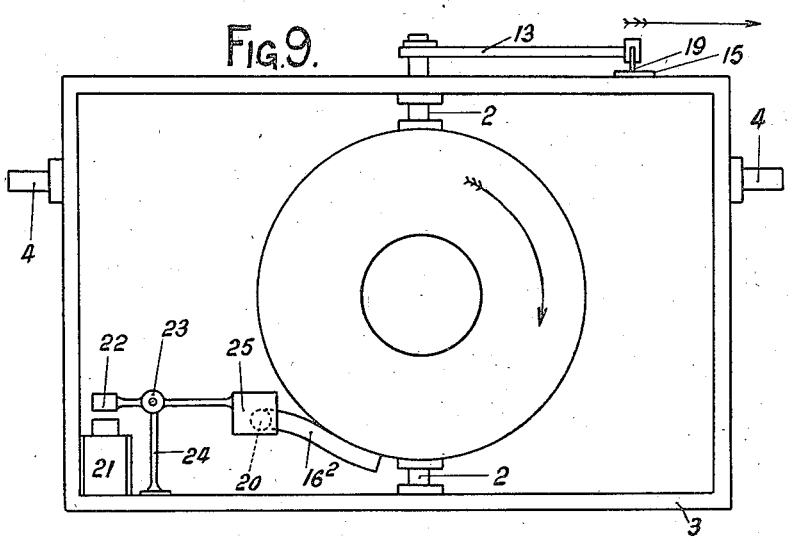
Figure 11:
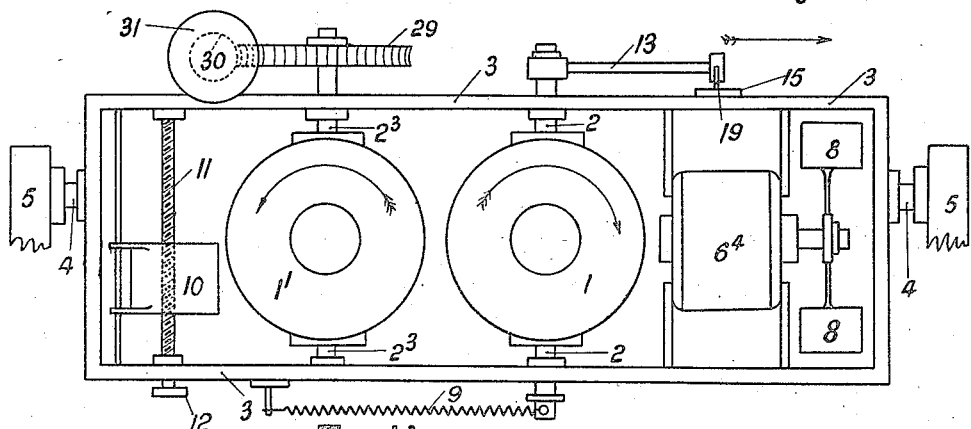
Figure 10:
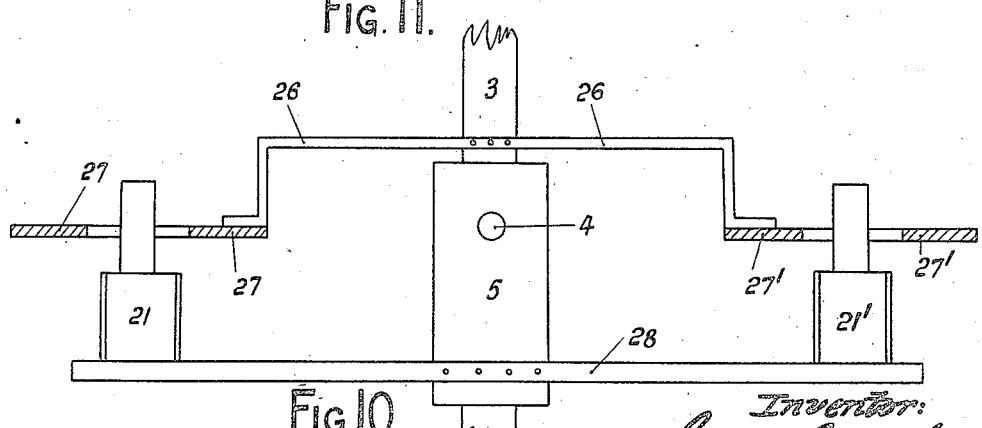

In the accompanying drawings, which illustrate several forms of the invention, Fig. 1 is an elevation and Fig. 2 a plan embodying one simple construction. Fig. 3 is an elevation illustrating an alternative construction. Fig. 4 is an elevation and Fig. 5 a plan showing yet another alternative. Fig. 6 is a plan showing a variation of the invention. Figs. 7 and 8 are, respectively, a plan and an elevation showing a further modification. Fig. 9 is an elevation showing another modification. Fig. 10 is a view in detail of means of damping oscillations. Fig. 11 is an elevation showing a modified construction according to the invention. Fig. 12 is a detailed view showing the attachment of a compensating gyroscope.

Referring to Figs. 1 and 2, a gyroscope 1 is pivoted vertically at 2, 2 to a frame 3, or the equivalent. The frame 3 is pivoted horizontally at 4, 4 to supports 5, 5 which are attached rigidly to the moving vehicle. The centre of gravity of the gyroscope lies in the line of the pivots 2, 2 and, when the frame 3 is vertical, the centre of gravity of the system carried on the pivots 4, 4 lies vertically below the line of pivots 4, 4. Horizontal spindles 7, 7' are driven rapidly in the direction of spin of the gyroscope flywheel, conveniently directly from the spindle of the flywheel of the gyroscope by means of reduction gearing contained in the casings 6, 6', and to these spindles 7, 7' are attached systems of vanes 8, 8; 8', 8'. The vanes move at high speed through the air and, as a result, a reaction couple is applied to the casing of the gyroscope, which couple is in the plane of the flywheel, or in a parallel plane, and is counter-clockwise as viewed from the starboard side of the vehicle. The gyroscope is centralized with respect to the frame 3 by means of two springs 9, 9, or the equivalent, as shown. The resting position of the device is one in which the frame is vertical, with the axis of the gyroscope horizontal and at right angles to the frame 3.

Now suppose the device set up on a moving vehicle with the pivots 4, 4 lying fore and aft with respect to the vehicle. Let the direction of motion of the vehicle be that indicated by the straight arrow, and the direction of spin of the gyroscope that indicated by the curved arrow, in Fig. 1. Suppose the device in the resting position, and let the vehicle execute a turning movement with angular speed $\psi$. The centrifugal couple experienced by the device is $MV\psi h$, where $M$ is the mass of the system carried on the pivots 4, 4, V is the speed of the vehicle and $h$ the distance of the centre of gravity of the system below the axis of the pivots 4, 4. This couple causes the gyroscope to turn on the pivots 2, 2 with angular speed $\Omega$ given by $$\Omega = \frac{MV\psi h}{I\omega},$$

Where $I$ is the moment of inertia of the flywheel of the gyroscope and $\omega$ is its angular velocity. Further, with the direction of spin of the gyroscope indicated by the curved arrow, $\Omega$ has the same direction as $\psi$, and hence if $MVh = I\omega$, the gyroscope keeps time with the vehicle and the frame remains vertical.

As already explained, the system is provided with gravity control with respect to the pivots 4, 4. The amount of the control may be varied by adjustment of a mass 10, which can be moved up or down by turning a screw 11 which is provided with a milled head 12.

The function of the rotating vanes is to damp out any precessional motion of the gyroscope. If the frame is deflected with respect to the vertical on the pivots 4, 4, the gyroscope precesses; the frame oscillates to and fro on the fore-and-aft pivots 4, 4, and the gyroscope oscillates to and fro on the pivots 2, 2. It is convenient to choose the springs 9, 9 so that the amplitudes of the latter oscillations are much larger than those of the former. As already explained, in consequence of the rotation of the vanes in the air there is applied to the casing of the gyroscope a couple in the plane of the flywheel and in the direction opposed to that in which the wheel is rotating. As the frame turns on the pivots 4, 4, this reaction couple damps out the motion. The couple, it will be observed, has a component about the pivots 4, 4 when the gyroscope is displaced on the pivots 2, 2 relatively to the frame 3. With the direction of rotation of the vanes specified the couple acts so as to oppose the motion of the frame on the pivots 4, 4; that is, the precessional motion of the gyroscope on the pivots 2, 2 is delayed, with the result that the oscillations of the gyroscope are damped out.

The mass 10 is internally screw-threaded to mate with the screw 11, so that when the screw is turned the mass moves up or down according to the direction in which the screw is turned. The mass 10 is provided with projections which slidably engage a guide bar as shown. By moving the mass 10 up or down the value of $h$ in the foregoing equation is diminished or increased. The mass is adjusted in accordance with the speed of the vehicle so that the equation $MVh = I\omega$ is satisfied.

An alternative construction is shown in elevation in Fig. 3. The gyroscope 1 provided as before with sets of driven vanes 8, 8 is rigidly attached to the frame 3, or the equivalent. As before, a displaceable mass 10 is mounted on the frame 3. The frame 3 is pivotally sustained in a surrounding frame 3' by fore-and-aft pivots 2', 2', as shown, and this frame 3' is connected in turn to the vehicle by means of vertical pivots 4', 4'. The frame 3' is rendered stable with respect to the moving vehicle with the pivots 2', 2' lying fore and aft with respect to the vehicle, by means of centralizing springs in the manner already described. The frame 3, with its carried system is provided with gravity control with respect to the pivots 2', 2', the amount of this control being determined by the equation $MVh = I\omega$, as already explained. The direction of motion of the vehicle being that shown by the straight arrow, and the direction of spin of the gyroscope flywheel, and of rotation of the vanes 8, 8 being that indicated by the curved arrow, the equilibrium position of the frame 3 is that in which it is upright with the frame 3' lying fore and aft with respect to the vehicle. In this construction the sets of vanes apply damping or stabilizing couples about the vertical pivots 4', 4'. The arrangement suffers from the defect that when the vehicle banks, and in consequence the pivots 4', 4' are deflected with respect to the vertical, the vanes apply a couple to the gyroscope about the pivots 4', 4', and this causes a disturbance. The construction shown in Figs. 1 and 2 is, for this reason, to be preferred.

Figure 5:
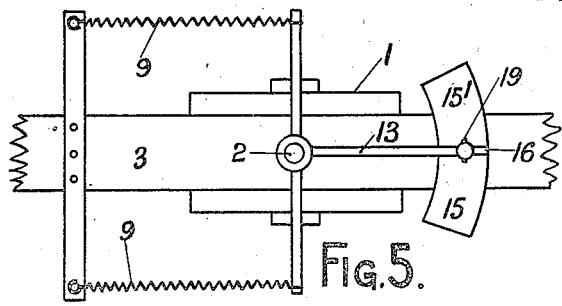

A further form of the invention is shown in elevation and in plan in Figs. 4 and 5. A gyroscope 1 is attached to a vertical frame 3, or the equivalent by means of vertical pivots 2, 2 and the frame is attached to uprights 5, 5 by fore-and-aft pivots 4, 4. Mounted on the frame 3 is a displaceable mass 10 capable of up-and-down movement as already described. The upper pivot 2 is prolonged and secured to the boss of an arm 13 terminating in a brush-holder or a contact making roller 19 which engages a commutator 15, 15'. The gyroscope 1 is centralized with respect to the frame 3 by means of springs 9 as before. The commutator consists of two conducting parts 15, 15' separated by a narrow strip 16 of insulating material. In the central or resting position, with respect to the frame 3, the axis of spin of the gyroscope is perpendicular to the frame 3 and the contact roller 19 rests on the strip of insulating material 16. Mounted on the frame 3 is a reversible electric motor $6^2$, to the shaft of which motor is attached a system of vanes 8 as shown. When the motor is energized, the vanes rotate, with the result that a couple is applied, tending to turn the frame 3 on the pivots 4, 4. The distance $h$ of the centre of gravity of the system carried on the pivots 4, 4, below the line of the pivots is adjusted in accordance with the equation $MVh = I\omega$, where M, V, I and $\omega$ have the meanings already specified.

As already explained, the direction of motion of the vehicle and the direction of spin of the gyroscope being those indicated by the straight and curved arrows, respectively, the gyroscope keeps time with the vehicle when the latter turns, and the frame 3 maintains the upright position.

If the frame 3 is deflected with respect to the vertical, the gyroscope precesses, the frame executing oscillations on the pivots 4, 4, and the gyroscope oscillations on the pivots 2, 2. If the springs are weak, the amplitude of the latter oscillations are great in comparison with the former. Further, there is a phase difference of 90° between the oscillations. As the frame oscillates from one extreme position to the extreme position on the other side of the vertical, the contactmaker 19 moves from the central position to one extremity of its range and back again to the central position. When the contactmaker leaves the central position, the motor $6^2$ comes into action and the vanes apply to the frame 3 a couple in the direction opposed to that in which it is turning on the pivots 4, 4. When the contactmaker crosses the central position from one side to the other, the direction of rotation of the motor is reversed. The applied couple due to the rotation of the vanes is such as to cause the gyroscope to turn on the pivots 2, 2 so as to return the contactmaker to the central position, when the motor goes out of action.

In Fig. 6 is shown in plan a form of the invention in which the necessity for a commutator and brush is avoided. A small motor $6^3$, to the spindle of which are attached vanes 8, 8, 8', 8' is attached to the frame 3 by means of vertical pivots $2^2$, as shown. The gyroscope 1 is attached to the frame 3 by means of vertical pivots 2, after the manner illustrated in Fig. 4. Carried by prolongations of the upper pivots 2, $2^2$ are arms 17 and 19'. The arm 17 has a bifurcated end engaging a small wheel 21 rotatably mounted on vertical bearings provided at the end of the arm 19'. When the axis of the gyroscope lies athwart the frame 3, the arms 17 and 19' are in line and parallel to the frame 3, which frame, as already explained, lies fore and aft with respect to the vehicle. The motor runs continuously and when the arms 17 and 19' are in line, the rotation couple, due to the passage of the vanes through the air, is in the plane of the frame 3, or in a parallel plane, and thus exerts no moment about the fore and aft pivots which attach the frame 3 to the moving vehicle. When the gyroscope 1 turns on the pivots 2, the motor $6^3$ is forcibly turned on the pivots $2^2$, and a stabilizing couple is applied to the frame 3. By making the arm 17 long in comparison with the arm 19' a small movement of the gyroscope brings about a relatively great movement of the motor and brings into existence an appreciable stabilizing couple.

Figs. 7 and 8 show, in plan and elevation respectively, a form of the invention in which the stabilizing or damping couples are applied about the fore and aft pivots 4, 4 as a consequence of the fact that when the gyroscope turns on the pivots 2, 2 a jet of air, derived from the periphery of the gyroscope casing, leaves the system in a line and in a direction which results in a couple being applied about the fore and aft pivots. Attached to the frame 3 are two pipes 17' and 18 (these are not shown in Fig. 7) shaped as shown. Attached to the periphery of the gyroscope casing is a pipe 16', and from this issues a jet of air at high speed. When the gyroscope is in the central position, that is, when its axis lies athwart the frame 3, the jet is projected through a space provided between the pipes 17', 18. When the gyroscope turns on the vertical pivots 2, 2 the pipe 16' moves relatively to the frame 3, and the jet is projected into one or other of the pipes 17' and 18, and is deflected through 90° and leaves at right angles to the frame 3. The construction is such that the pipes 16', 17' and 18 are situated at a considerable distance below the pivots 4, 4, with the result that considerable couples, tending to return the gyroscope 1 to the central position, that is restraining or stabilizing couples, are applied to the system about the pivots 4, 4.

In Fig. 9 is shown in elevation a further means of providing for the production of stabilizing couples. Attached to the periphery of the gyroscope casing are two pipes $16^2$, $16^2$, one only being shown in the figure. These terminate in nozzles 20, 20, which are directed at right angles to the frame 3. Attached to a prolongation of one of the pivots 2, 2 is an arm 13 terminating in a contactmaker 19 arranged to move freely on the commutator 15. This commutator consists of two plates or strips of conducting material separated by a strip of insulating material, as already described. Attached to the frame 3 are two electro-magnets 21, each of which is adapted, when energized, to attract a piece of soft iron 22, carried at one end of a rod pivoted at 23 to a pillar 24, or the equivalent. To the other end of each rod is attached a screen 25, and each rod is weighted so that normally it lies with the screens in front of the nozzles 20, 20. When the gyroscope is in the central position the contactmaker rests on the insulating strip, with the result that the screens lie in front of the nozzles. When the gyroscope turns on the pivots 2, 2, current is passed through the coil of one or other of the electro-magnets with the result that the corresponding screen is lifted and a jet of air leaves the system in a direction perpendicular to the frame 3, and the nozzles being at a considerable distance below the line of the pivots 4, 4, this results in the application to the system of a damping or stabilizing couple.

In Fig. 10 is shown in elevation a still further means of damping out oscillations of the gyroscope which is convenient in cases where two-phase or three-phase alternating current is employed for driving the gyroscope or gyroscopes. The gyroscope 1 is pivoted, as before, to the frame 3 by means of vertical pivots 2, 2. On a prolongation of one of the pivots 2, 2 is an arm terminating in a wheel or roller which engages a simple commutator of the type already described. Mounted on an arm 28 attached to one of the uprights 5, and thus to the moving vehicle are two electro-magnets 21, 21'. Carried by an arm 26 secured to the frame 3 are two discs of aluminium 27, 27'. At the centre of each disc is a hole of considerable diameter, and the discs surround the poles (which are elongated) of the electro-magnets. When the gyroscope is central with respect to the frame 3, the contact roller rests on the insulating strip, and no current is supplied to the coils of the electro-magnets; but when the gyroscope turns, with respect to the frame 3, on the pivots 2, 2, alternating current, obtained from one of the phases of the supply available for driving the gyroscope, passes through the coil of one of the electro-magnets, and the surrounding disc is strongly repelled. The arrangement is such that the repelling force results in the application to the frame 3 of a restraining or stabilizing couple.

One disadvantage from which the arrangements so far described suffer is that where the speed of the vehicle is relatively small the amount of gravity control which must be given to the system with respect to the fore and aft pivots is large, and the natural period of the gyroscopic pendulum is consequently small. The arrangements are valuable for use in aeroplanes and airships, but in the case of marine craft the amount of gravity control necessary, in order that the equation $MVh = I\omega$ may be satisfied renders the natural period small, and diminishes the value of the arrangements.

In Fig. 11 is shown an arrangement in which the disadvantage is overcome. A main gyroscope 1 is attached, as before, to a vertical frame 3 by means of vertical pivots 2, 2. One of these pivots is prolonged, and to the prolongation is attached an arm 13 which terminates in a contact-wheel or roller 19 adapted to engage a contact-making device consisting, as already described, of two conducting strips separated by a narrow strip of insulating material. The gyroscope is centralized by means of springs 9, 9 after the manner already described. Rigidly attached to the frame 3 is a second gyroscope 1' with its axis horizontal. It is convenient to mount this second gyroscope on vertical pivots $2^3$, $2^3$, and to define the direction of its axis of spin, with respect to the plane of the frame 3, by means of a worm-wheel 29, carried on a prolongation of one of the pivots $2^3$, and a worm 30 operated by a milled head 31, the shaft of the worm being mounted in bearings carried by the frame 3. With this arrangement the gyroscope 1' may be set with its axis of spin making any desired angle with a normal to the plane of the frame 3.

As before, the frame 3 is attached to fore and aft uprights 5, 5, by means of pivots 4, 4. Carried on the frame 3 is a reversible motor $6^4$ on the spindle of which is mounted a system of vanes 8 adapted to apply to the frame 3 a couple in a plane perpendicular to the line of the fore and aft pivots 4, 4. This motor is controlled by the contactmaker 19 and the commutator 15 after the manner already described. When the gyroscope 1 leaves the central postion, the contactmaker supplies current to the motor which rotates in the direction which results in there being applied to the frame 3 a couple tending to return the gyroscope 1 to the central position.

If the frame 3 is deflected with respect to the vertical, and the device is then left to itself, the frame 3 oscillates to and fro on the pivots 4, 4, and the gyroscope 1 oscillates to and fro on the pivots 2, 2. The gyroscope 1' being rigidly attached to the frame, has no effect on the period of the pendulum. The device returns to the vertical as a consequence of the restraining couples applied to the gyroscope 1 by the vanes 8, 8.

Now, suppose that the device is set up on a moving vessel with the pivots 4, 4 lying fore and aft. Suppose the gyroscopes 1 and 1' to be identical, the gyroscope 1' being set so that its axis of spin makes an angle $\theta$ with the normal to the plane of the frame 3. Let the directions of spin of the two gyroscopes be as shown by the curved arrows, and the direction of motion of the vessel that shown by the straight arrow. Suppose now the vessel to turn to port at angular speed $\psi$. The gyroscope 1' is turned forcibly at this angular speed and there is applied to the frame 3, and consequently to the gyroscope 1, a couple whose moment is $I \omega \cos \theta \psi$, where I is the moment of inertia of the flywheel of either gyroscope and $\omega$ is the angular speed of the flywheel of 1'. The direction of this couple is such as to cause the gyroscope 1 to turn on the pivots 2, 2 in the sense of $\psi$. If M is the mass of the system carried on the pivots 4, 4, $h$ the distance of the C. G. of the system below the line of 4, 4, and V is the speed of the vessel, the so-called centrifugal couple experienced by the frame is $MVh\psi$. This couple has the sense of the former couple, and causes the gyroscope 1 to turn to port. If the angular speed of the gyroscope 1 is also $\omega$, we have for the angular speed $\Omega$ at which it turns on the pivots 2, 2

$$\Omega = \frac{MV\psi h + I\omega \cos \theta \psi}{I\omega}$$

and if $I\omega(1-\cos\theta) = MVh$, $\Omega = \psi$ and the gyroscope 1 keeps time with the frame 3, and there is no disturbance as a consequence of the turning motion.

If the device is set up on a vehicle with the pivots 4, 4 lying athwart the vehicle, then the device is available to define the vertical provided that $\theta = O$. The angular momentum lying athwart the frame due to the compensating gyroscope is numerically equal to that of the stabilizing gyroscope.

It is easy to show that if the condition just investigated is fulfilled by the combination of gyroscopes the device has the very important property that if the frame 3 is deflected with respect to the true vertical, the device comes to rest with the frame 3 in the true vertical, and the axis of the gyroscope 1 lying athwart the frame 3. The resting position of the frame 3 is, in fact, the true vertical, even when the vehicle on which the device is mounted is turning.

If the direction of motion of the vessel is reversed, the directions of the gyroscope couple (due to the compensating gyroscope 1') and of the centrifugal couple are reversed, and the compensation holds good.

When the speed of the vehicle is changed, it is necessary to alter $\theta$ by means of the worm and wheel adjustment, or to alter $h$ by moving the compensating weight 10 up or down by means of the screw adjustment.

It will readily be seen that the gyroscopes 1 and 1' need not be identical. There must be provided, lying athwart the frame 3, and forcibly turned with the frame a component of spin $I_1 \omega_1$ such that $I \omega = I_1 \omega_1 + MVh$.

The compensating gyroscope may be attached to the frame 3 by means of fore and aft pivots 32, and centralized with respect to the frame by vertical springs 33, 33' and stops 34, 35, as shown in Fig. 12. So mounted it acts after the manner of Gilbert's bary-gyroscope, and is available to indicate that the vehicle is turning. The movement of the gyroscope 1' relatively to the frame may be utilized to make electric contacts through the medium of the stops 34, 35 and the making of such contacts may be utilized for a variety of purposes, notably for steering.

An alternative arrangement consists in rotating the main gyroscope 1 in the counterclockwise direction, and the compensating gyroscope 1' in the clockwise direction as viewed from the starboard side of the vehicle. If there is no disturbance of the system brought about by turning of the vehicle, and the main gyroscope is to keep time with the frame 3 during the turning motion, we have $I_1 \omega_1 = I_2 \omega_2 - MVh$.

I claim:—

1. In combination, a moving body, horizontal pivots extending in the normal direction of movement of said body, a vertical frame movable about said pivots, a gyroscope including a casing attached to said frame and pivotally movable on a vertical axis, the axis of spin of said gyroscope being horizontal and normally athwart the plane of said frame, means for centralizing said gyroscope with respect to said frame, means for adjusting the amount of gravity control possessed by said frame so that the moment of momentum of said gyroscope will be equal to the product of the mass carried on said horizontal pivots, the distance of the centre of gravity of said mass below said horizontal pivots, and the speed of said body, and means for applying couples about said horizontal pivots whereby said gyroscope is stabilized.

2. In combination, a moving body, horizontal pivots extending in the normal direction of movement of said body, a vertical frame mounted on said pivots, a gyroscope including a casing attached to said frame and pivotally movable on a vertical axis, the axis of spin of said gyroscope being horizontal and normally athwart the plane of said frame, means for centralizing said gyroscope with respect to said frame, a weight attached to said frame, a screw rotatable to raise and lower said weight, and means for applying couples about said horizontal pivots whereby said gyroscope is stabilized.

3. In combination, a moving body, horizontal pivots extending in the normal direction of movement of said body, a vertical frame mounted on said pivots, a gyroscope attached to said frame and pivotally movable on a vertical axis, the axis of spin of said gyroscope being horizontal and normally athwart the plane of said frame, spring means for centralizing said gyroscope with respect to said frame, a weight attached to said frame, means for raising and lowering said weight and air-impelling means under control of said gyroscope for applying couples about said horizontal pivots.

4. In combination, a moving body, horizontal pivots extending in the normal direction of movement of said body, a vertical frame mounted on said pivots, a gyroscope including a casing attached to said frame and a spinning body within said casing, the axis of spin being horizontal and normally athwart the plane of said frame, a weight attached to said frame, a screw rotatable to raise and lower said weight, and means for applying a couple to the casing of the gyroscope in the plane of the spinning body.

5. In combination, a moving body, horizontal pivots extending in the normal direction of movement of said body, a vertical frame mounted on said pivots, a gyroscope including a casing attached to said frame, and a spinning body, the axis of spin of said body being horizontal and normally athwart the plane of said frame, a weight attached to said frame, means for raising and lowering said weight, and air-impelling means for applying a couple to the casing of said gyroscope in the plane of the spinning body.

In testimony whereof I have signed my name to this specification.

JAMES GORDON GRAY.